United States Patent [19]

Adams et al.

[11] Patent Number: 5,665,272

[45] Date of Patent: Sep. 9, 1997

[54] MULTIFUEL COMBUSTION ENGINE AND USE IN GENERATING OBSCURANT SMOKE

[75] Inventors: William A. Adams, Baltimore; Janice A. Fritz, Bel Air; Terry L. Thurman, Aberdeen, all of Md.

[73] Assignee: The United States of America as represented by the Secretary of the Army, Washington, D.C.

[21] Appl. No.: 507,960

[22] Filed: Jul. 27, 1995

[51] Int. Cl.$^6$ .................. C09K 3/30; F02C 3/20; F23R 3/36

[52] U.S. Cl. .................. 252/305; 60/39.463; 60/211; 60/212; 60/213; 60/217; 102/334

[58] Field of Search .................. 252/305; 102/334; 60/211, 212, 213, 217, 737, 39.463, 730; 123/179.7

[56] References Cited

U.S. PATENT DOCUMENTS

| | | | |
|---|---|---|---|
| 2,402,964 | 7/1946 | Hoffstrom | 123/179.7 X |
| 2,931,429 | 4/1960 | Brown | 60/39.463 |
| 2,995,890 | 8/1961 | Dolza | 123/179.7 X |
| 3,085,393 | 4/1963 | Hamlin, Jr. | 60/211 |
| 3,886,728 | 6/1975 | Quinn | 60/737 X |
| 4,019,477 | 4/1977 | Overton | 123/179.7 X |
| 4,420,929 | 12/1983 | Jorgensen et al. | 60/737 X |
| 4,459,219 | 7/1984 | Kiley | 252/305 |
| 4,582,126 | 4/1986 | Corey | 165/82 |
| 4,651,712 | 3/1987 | Davis | 431/1 X |
| 5,090,891 | 2/1992 | Hemsath | 431/1 |
| 5,115,633 | 5/1992 | Priser et al. | 102/334 X |

*Primary Examiner*—Richard D. Lovering
*Attorney, Agent, or Firm*—Ulysses John Biffoni; Edward L. Stolarun

[57] ABSTRACT

The multifuel combustion engine is a Lenoir cycle (constant volume), pulsejet combustion engine capable of operating on gasoline, diesel or kerosene based fuels. Although the preferred embodiment is described in terms of Lenoir cycle pulsejet engines, the present invention has application to combustion engines in general. The conventional Lenoir cycle engine has been modified to provide a direct, premixed fuel-air spray to the combustion chamber and means for igniting the fuel-air spray. Said fuel-air spray is separate and distinct from the fuel-air charge which is fed to the combustion chamber from the engine head. Additionally, means are provided for preheating the combustion chamber so that the same fuel-air ratio mixes can be fed to the combustion chamber for cold start or hot restart of the engine. A method of burning different fuels in combustion engines is also claimed. The present invention includes the application of the modified Lenoir cycle engines to smoke generator equipment.

25 Claims, 3 Drawing Sheets

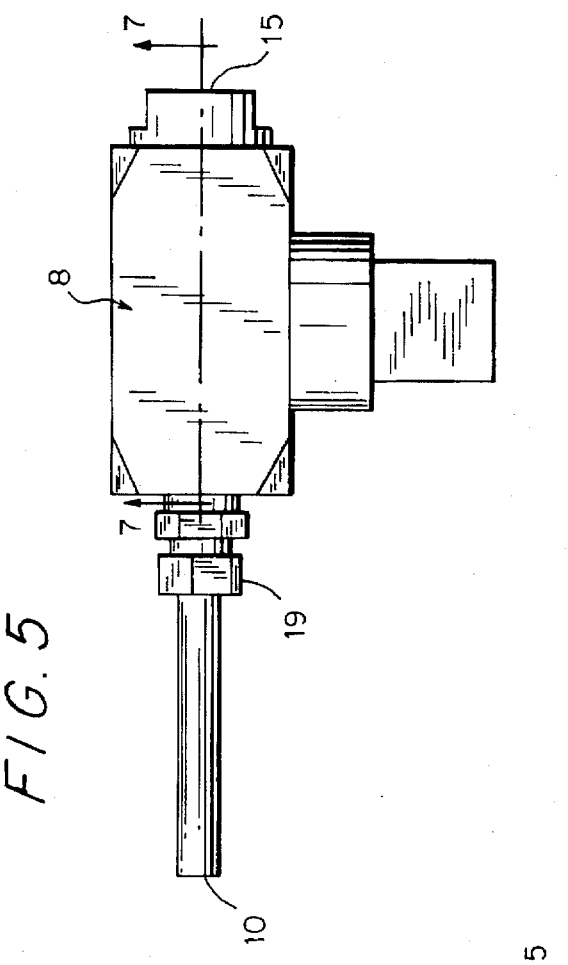
FIG. 5
FIG. 4
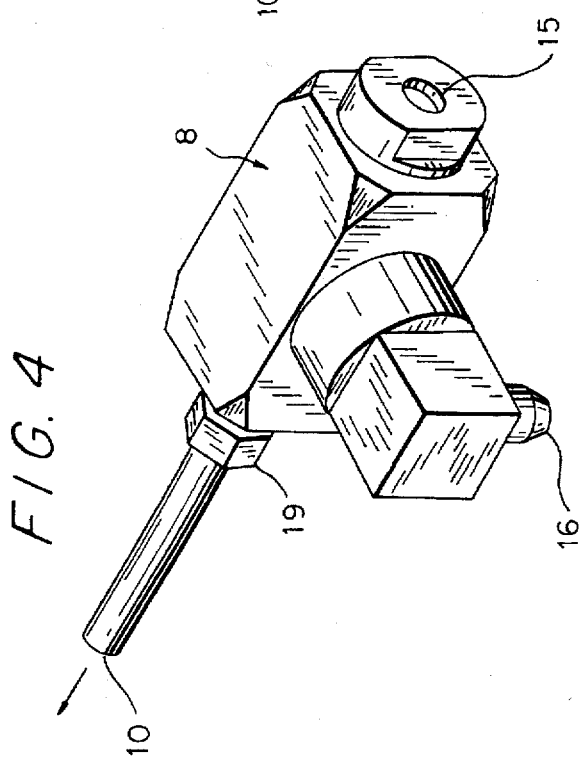
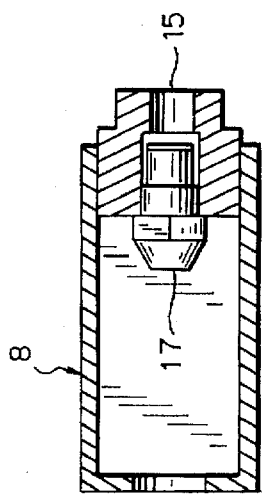
FIG. 7
FIG. 6
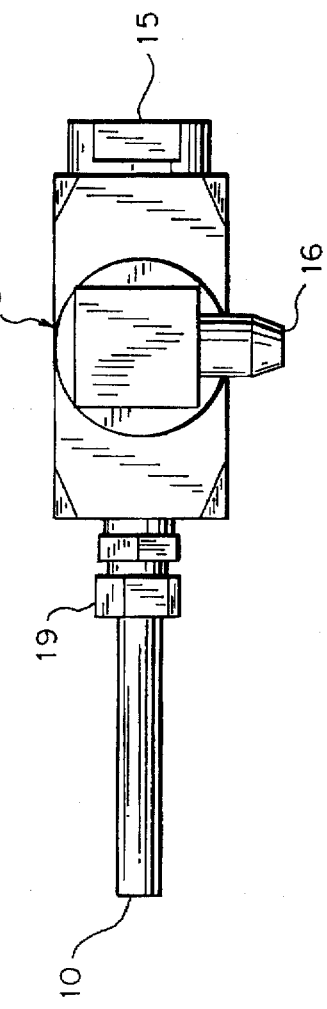

MULTIFUEL COMBUSTION ENGINE AND USE IN GENERATING OBSCURANT SMOKE

GOVERNMENT INTEREST

The invention described herein may be manufactured, used, and licensed by or for the United States Government.

BACKGROUND OF THE INVENTION

1. Field of the Invention

This invention pertains generally to the field of combustion engines and more particularly to combustion engines capable of operating on diverse fuels. In general, modifications are made to a combustion engine so that it is capable of operating on diverse fuels such as gasoline, diesel and kerosene.

2. Description of the Prior Art

The U.S. Army has used Lenoir cycle pulsejet combustion engines in smoke generator systems since the 1940s. Lenoir cycle engines are constant volume, pistonless engines. The operation of a conventional Lenoir cycle engine used in Army smoke generators is as follows: (1) a compressed air charge and gasoline are sprayed into the engine head causing the petal valves in the head to open so that the air-fuel charge can enter the combustion chamber; (2) a spark plug in the combustion chamber ignites the mixture, and the explosion closes the petal valves and the "pulse" travels down a tube to provide heat (for the vaporization of fog oil in Army smoke generator systems); and (3) as the pulse leaves the combustion chamber a low pressure area is induced which opens the petal valves and allows the next air-fuel charge to enter the combustion chamber to be ignited. After a few seconds of operation, the combustion chamber is hot enough to ignite the air-fuel charge without using a spark. A properly operating Lenoir cycle pulsejet will produce 60 explosions per second. The Army uses such engines to burn gasoline to produce heat which is then used to vaporize fog oil thereby producing a visual obscurant smoke cloud. Such clouds are used for defensive purposes on the battlefield.

All previous Lenoir cycle pulsejet combustion engines could only operate using gasoline as the fuel source. Because Lenoir cycle engines are pistonless constant volume engines, the ability to ignite the fuel in a cold engine is dependent upon the flashpoint temperature of the fuel being used. Therefore, gasoline has always been used in the Army's Lenoir cycle pulsejet combustion engines because gasoline has a very low flashpoint temperature and is, therefore, easy to ignite in a cold engine. However, this low flashpoint also translates into the fact that gasoline is very dangerous to store, dispense and use. For this reason, the Army has implemented a program to phase out gasoline and replace it with diesel or kerosene based fuels. However, since diesel and kerosene fuels have flashpoints much higher than gasoline, existing Lenoir cycle engines will not ignite these fuels.

The invention described herein modifies the conventional Lenoir cycle pulsejet combustion engine so that it can operate using gasoline, diesel, or kerosene based fuels despite the significant difference in flashpoint temperatures of such fuels. Because diesel and kerosene based fuels have much higher flashpoints they are safer to store, dispense and use. This provides for safer operation of Lenoir pulsejet engines in Army smoke generator systems and improves the applicability of such engines to fields such as home heating systems. Moreover, the present invention provides the potential of multifuel use in combustion engines in general, and is not limited in application to Lenoir cycle pulsejet combustion engines.

SUMMARY OF THE INVENTION

The present invention modifies combustion engines so that they are capable of operating on gasoline, diesel or kerosene based fuels. Although applicable to combustion engines generally, the present invention pertains more particularly to a Lenoir cycle (constant volume) pulsejet combustion engine capable of individually burning gasoline, diesel and kerosene based fuels which is described herein. Additionally, the present invention provides a method for burning these different fuels in combustion engines generally. Finally, a particular application of such an engine for use as a military obscurant smoke generator is also described. However, it is envisioned that the present invention will have broad applications to other areas, for example, as in home heating systems which include multifuel pulsejet engines.

Fuels will ignite when either the self-ignition temperature or pressure of the particular fuel is reached. Since the Lenoir cycle pulsejet engine has no piston to compress the air-fuel charge, some means must be used to raise the temperature to the flashpoint of diesel and kerosene fuels. This temperature rise does not have to occur throughout the combustion chamber, but rather, combustion can occur in a small area which will then spread.

This problem has been overcome by providing a fuel-air spray directly to the combustion chamber, said spray being separate and distinct from the fuel-air mix provided to the engine head. The fuel-air spray to the combustion chamber is then ignited, and the spray and ignition in the combustion chamber is continued until an operating temperature of over 1500 degrees F. is reached.

Another problem associated with initiating combustion is that a fuel flow sized to start a cold engine would provide too rich a fuel-air mixture for a hot restart of the engine. The present invention additionally avoids this problem by providing means for localized preheating of the combustion chamber. Thus, the fuel-air spray to the combustion chamber is metered to start a hot engine, the engine being hot because of localized preheating of the combustion chamber. Therefore, the hot restart or cold start of an engine is accomplished without altering the fuel-air mixture in the spray to the combustion chamber or the fuel-air mix to the engine head.

It is then an object of the present invention to provide a multifuel combustion engine capable of burning gasoline, diesel and kerosene based fuels.

It is a further object of the present invention to provide a multifuel Lenoir cycle pulsejet combustion engine capable of burning gasoline, diesel and kerosene based fuels.

It is a further object of the present invention to provide a means for spraying a premixed fuel-air spray directly to the combustion chamber of the engine, said spray being distinct and separate from the fuel-air mix fed to the combustion chamber from the engine head.

It is a further object of the present invention to provide a means for directly igniting said fuel-air spray in the combustion chamber.

It is a further object of the present invention to provide a means for preheating said combustion chamber before a cold start so that the same fuel-air mixture can be used for a cold start or a hot restart of the engine.

It is a further object of the present invention to provide a multifuel smoke generator system using a combustion engine capable of burning gasoline, diesel or kerosene based fuels.

Other features and advantages of the present invention will be apparent from the following description in which the preferred embodiments have been set forth in conjunction with the accompanying drawings.

BRIEF DESCRIPTION OF THE DRAWINGS

FIG. 4 is a perspective view of the fuel-air mix manifold of FIG. 2;

FIG. 5 is a top view of the fuel-air mix manifold of FIG. 2;

FIG. 6 is a side view of the fuel-air mix manifold of FIG. 2;

FIG. 7 is a cross-sectional view of the fuel-air mix manifold taken along A—A of FIG. 5.

DETAILED DESCRIPTION OF THE PREFERRED EMBODIMENT

Reference will now be made in detail to the present preferred embodiment of the invention, an example of which is illustrated in the accompanying drawings. The present preferred embodiment of the present invention comprises a Lenoir cycle (constant volume) pulsejet combustion engine capable of operating using either gasoline, diesel, or kerosene based fuels.

Figure 1:
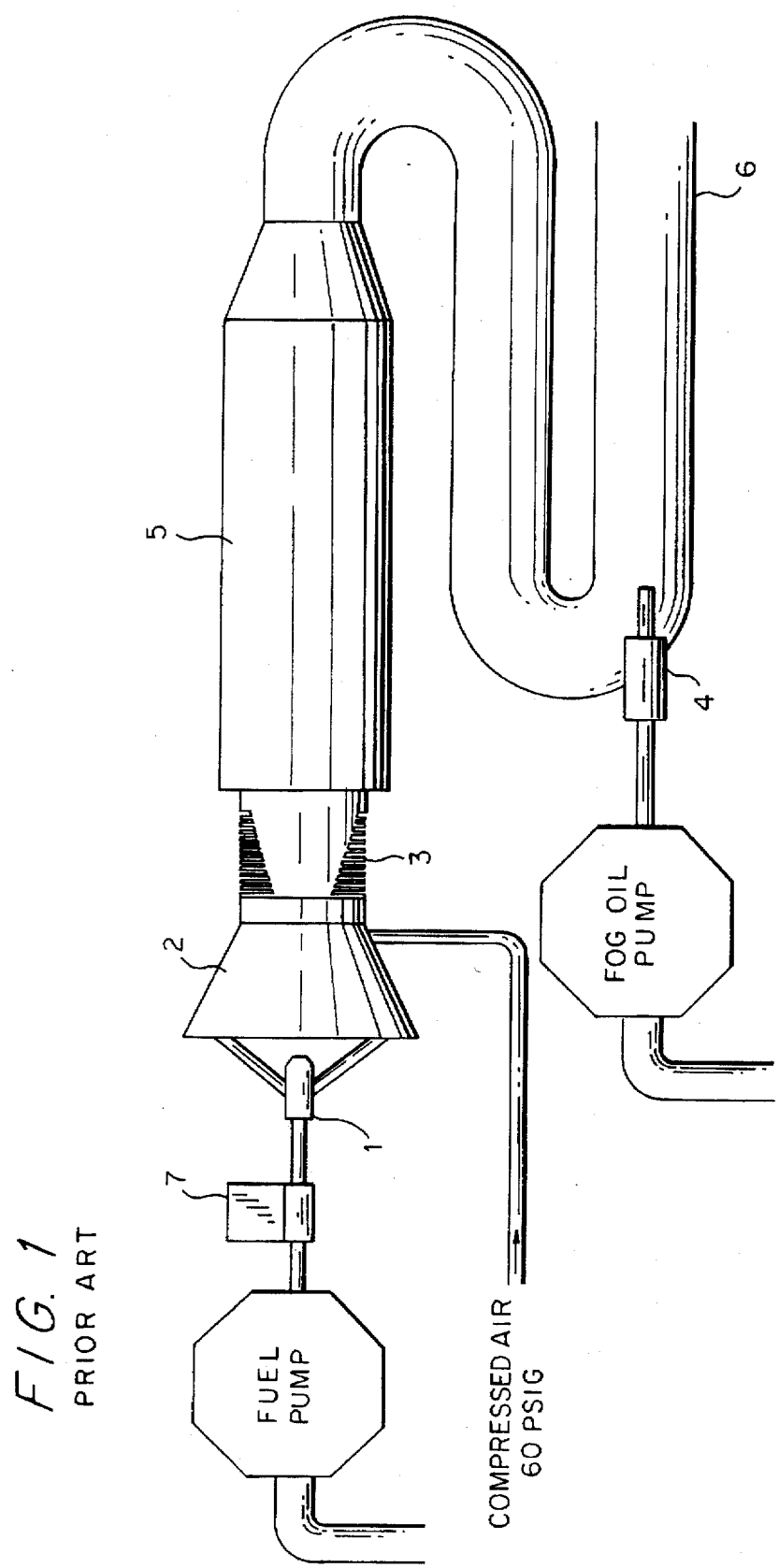
FIG. 1 is a diagram of the conventional Lenoir cycle pulsejet combustion engine and represents the prior art single fuel engine.
Figure 2:
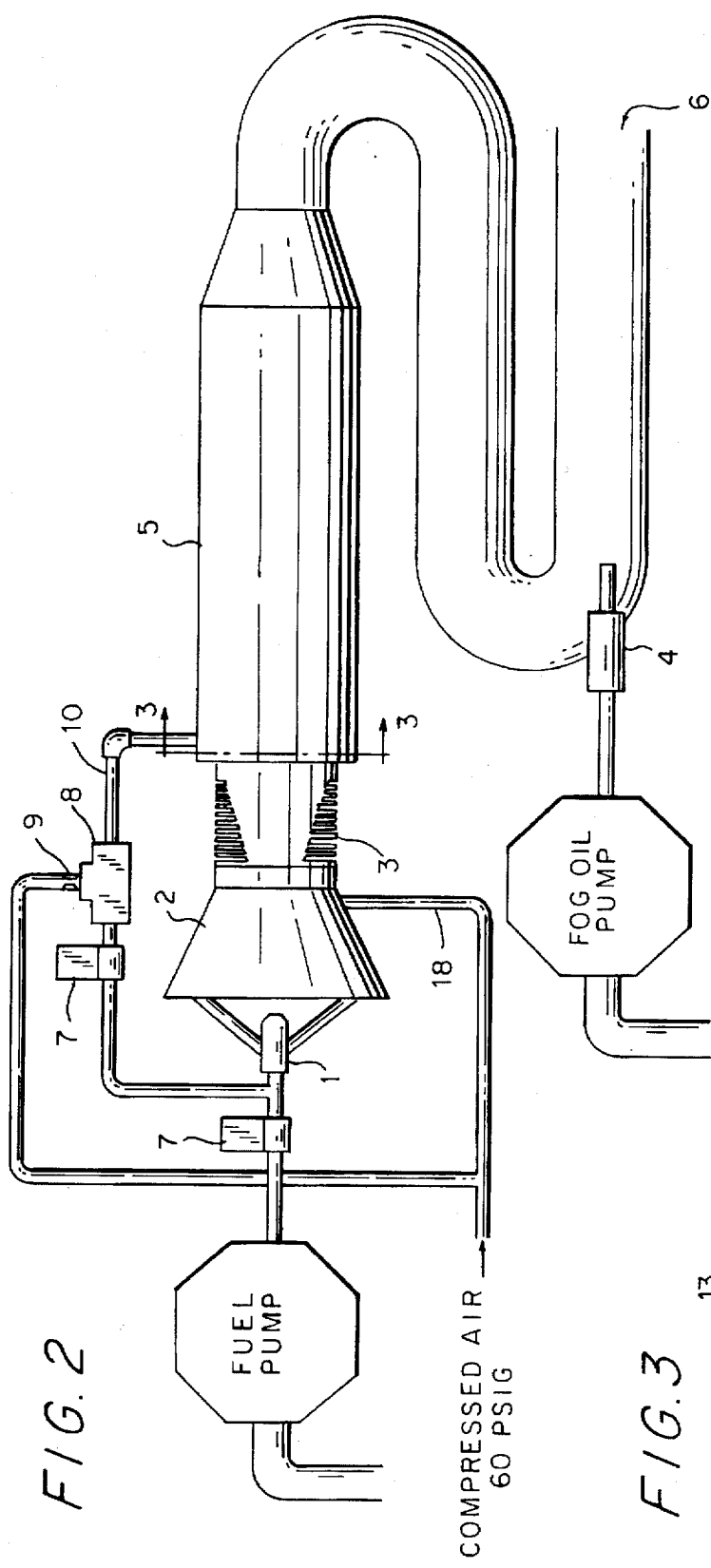
FIG. 2 is a diagram showing the multifuel Lenoir cycle pulsejet combustion engine and represents the preferred embodiment of the invention.
Figure 3:
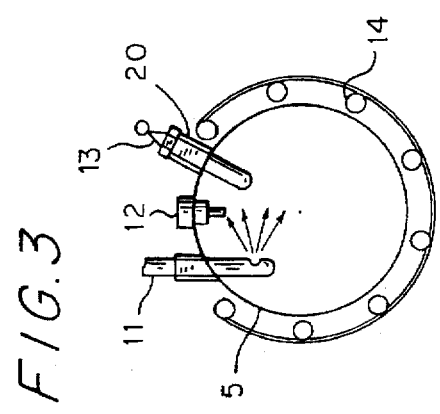
FIG. 3 is a cross-sectional view of the combustion chamber taken along A—A of FIG. 2.

The elements of the Lenoir cycle multifuel combustion engine are depicted in FIGS. 2 and 3. FIG. 1 represents the conventional prior art single fuel Lenoir cycle combustion engine, and common components in FIGS. 1 and 2 are identically numbered. It can be seen that the major components of the preferred embodiment include an engine head (3), an engine head fuel nozzle (1), an engine head compressed air inlet (18), a cone assembly (2), a combustion chamber (5), a spark ignitor (12), a glow plug (13), a band heater (14), a fuel-air injector (11), a fuel-air mix manifold (8) and fluid conduits interconnecting some of the above components. The interrelationship of these components will now be described.

Making reference to FIG. 2, the cone assembly (2) is connected to the inlet of the engine head (3). The cone assembly (2) comprises a conical aluminum structure having an open interior with a generally conical interior surface which facilitates air and fuel transfer to the engine head (3). At engine startup fuel is supplied to both the engine head fuel nozzle (1) and the fuel-air mix manifold (8) using conventional pumps, conduits, and solenoid valves (7) to control the flow. In the preferred embodiment, the engine head fuel nozzle (1) is mounted within the cone assembly (2) and is located at the inlet to the engine head (3) so that a 30 degree hollow-cone fan spray is provided to the engine head (3) at 2.25 gallons per hour. A compressed air inlet (18) is also connected to the cone assembly (2) so that compressed air is also provided to the engine head (3) inlet.

The engine head (3) comprises a standard Lenoir cycle pulsejet engine head of machined aluminum. In the preferred embodiment, the engine head (3) has an inlet, a conical inner surface tapered outward at 30 degrees from inlet to outlet, and an outlet having 16 ports feeding the combustion chamber (5). The engine head (3) outlet includes a conventional petal valve, and is connected to the inlet of the combustion chamber (5). Flow from the engine head (3) to the combustion chamber (5) is controlled by said petal valve which has 16 spring-steel petals which are forced open and closed by the pressure pulse traveling through the system. The petal valve is mounted to the engine head (3) on a central bolt at its 16 port outlet and a backstop is used to limit the opening of the 16 spring-steel petals. The petal valve thereby opens and closes the outlet from the engine head (3) to the combustion chamber (5) as explosions occur within the combustion chamber (5).

In the preferred embodiment, the combustion chamber (5) is comprised of a 4-inch outer diameter inconel tube, 8 inches in length and having a wall thickness of 0.063 inches. In the preferred embodiment, a 150 watt glow plug (13) and a 650 watt band heater (14) were added to preheat the combustion chamber (5). A port (20) was welded to the side of the combustion chamber (5) to insert the glow plug (13) so that it extends into said combustion chamber (5). The band heater (14) was mounted on the circumference of the combustion chamber (5).

Again making reference to FIG. 2, it can be seen that both fuel and compressed air are also provided to the fuel-air mix manifold (8). The flow of fuel is controlled by a conventional solenoid valve (7). The air inlet conduit to the fuel-air mix manifold (8) comprises copper tubing and includes a 0.078 inch restriction (9) in order to reduce the pressure of the compressed air to about 12 pounds per square inch gauge before it is fed to the mix manifold, thereby optimizing combustion.

Making reference to FIGS. 4 through 7, it can be seen that the fuel-air mix manifold (8) comprises a one inch pipe tee having a fuel inlet (15), a compressed air inlet (16), and a fuel-air mix outlet leg (19). Further, the fuel inlet to the manifold includes a 0.30 gallons per hour fuel nozzle (17) to atomize the fuel.

In the fuel-air mix manifold (8), a metered amount of fuel, about 0.30 gallons per hour, is mixed with a controlled amount of 12 pounds per square inch gauge air. Making reference to FIGS. 2, 3 and 4, the mixture is then transported from the fuel-air outlet-leg (19) of the manifold (8) through stainless steel tubing (10) to the fuel-air injector (11) which penetrates the combustion chamber (5). The injector (11) is comprised of high-strength, heat-resistant metal alloy tubing such as inconel and is disposed within the combustion chamber (5) so that the fuel-air spray from the injector (11) comes within 1/32 of an inch of a spark ignitor (12) located in the combustion chamber (5). In the preferred embodiment, the injector (11) comprises a ¼ inch inconel tube having its end welded shut and an orifice in its side so that the appropriate fuel-air spray is created.

The operation of the present preferred embodiment of the present invention will now be described. Reference is again made to FIGS. 2 and 3.

Before startup of a cold engine when using diesel or kerosene based fuels, the combustion chamber (5) must be preheated in order to provide a uniform ambient temperature to the combustion chamber (5). This procedure ensures that the same ratio of fuel-air mixture can be used to start a cold engine or to restart a hot engine. To achieve this preheating of the combustion chamber (5) both the glow plug (13) and the band heater (14) are activated for up to two minutes, depending on the fuel being used, before the engine is started. The preheat cycle raises the temperature of the combustion chamber to about 600 degrees F., bringing it closer to its operating temperature and thereby allowing the same fuel-air ratio to be used to start either a cold or a hot engine.

At startup, again making reference to FIG. 2, it can be seen that compressed air and fuel are separately supplied to both the fuel-air mix manifold (8) and the cone assembly (2) leading to the engine head (3). It is further apparent then that fuel-air mixtures are fed to the combustion chamber (5) by two separate means. The first being the opening of the engine head (3) petal valves, and the second being the premixed fuel-air charge which is fed from the fuel-air mix manifold (8) to the injector (11) which is located within the combustion chamber (5). The injector (11) fuel-air spray inside the combustion chamber (5) comes within 1/32 of an inch of the spark ignitor (12). The spark then ignites the mixture in the combustion chamber (5) (regardless of the fuel used) and pulsing begins. The properly operating pulsejet system will produce 60 explosions (pulses) per second.

After a few seconds of operation, the combustion chamber (5) reaches its operating temperature of about 1500 degrees F. regardless of the fuel being used. At this point, the engine may be operated in its "run" mode. In the "run" mode, all compressed air to the engine is stopped, both that to the engine head cone assembly (2) and that to the fuel-air mix manifold (8). Additionally, the flow of fuel to the fuel-air mix manifold (8) is stopped, and the spark ignitor (12) in the combustion chamber (5) is deactivated. At this time, fuel is only being provided to the engine head fuel nozzle (1) and together with ambient air combustion is maintained in the system regardless of the fuel being used.

The present preferred embodiment of the present invention includes the use of the multifuel combustion engine described above in an Army obscurant smoke generating system. Once the engine has reached operating temperature, fog oil can be vaporized using the heat generated by the combustion chamber (5) exhaust. As the hot exhaust gases leave the combustion chamber they are transported through exhaust tubing (6). Making reference to FIG. 2, fog oil is injected into the exhaust tubing (6) using a fog oil nozzle (4), the fog oil is thereby vaporized and obscurant cloud formation begins. Fog oil clouds provide a visual obscuration which can be used for defensive purposes by the military on the battlefields. It can be seen that fog oil is provided to the fog oil nozzle (4) using conventional oil pumps, valves, and interconnecting conduits.

While the invention has been described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims.

What is claimed is:

1. A multifuel combustion engine, comprising:
   (a) an engine head having an inlet and an outlet;
   (b) means for providing air to the inlet of said engine head;
   (c) means for providing fuel to the inlet of said engine head so that the air and fuel are discharged into said engine head forming a fuel-air charge;
   (d) a combustion chamber positioned at the outlet of said engine head, said combustion chamber having an inlet and an outlet;
   (e) valve means for controlling the flow of the fuel-air charge from said engine head outlet to said combustion chamber inlet;
   (f) means for providing a fuel-air spray to said combustion chamber, said fuel-air spray being distinct and separate from the fuel-air charge within said engine head, said fuel-air spray being used to begin operation of said engine;
   (g) means for igniting said fuel-air spray within said combustion chamber; and
   (h) means for preheating said combustion chamber.

2. The engine of claim 1, wherein said engine is a Lenoir cycle pulsejet combustion engine.

3. The engine of claim 1, wherein said valve means is a one-way check valve enabling flow of the fuel-air charge only in the direction from said engine head to said combustion chamber.

4. The engine of claim 3, wherein said check valve is a petal valve.

5. The engine of claim 1, wherein said means for providing air comprises:
   (a) a source of compressed air; and
   (b) a conduit extending from said source of compressed air and terminating at the inlet of said engine head so that compressed air is discharged into said engine head.

6. The engine of claim 1, wherein said means for providing fuel comprises:
   (a) a source of fuel;
   (b) a fuel pump;
   (c) a fuel nozzle located at the inlet of said engine head so that fuel is sprayed into the engine head; and
   (d) a conduit interconnecting said fuel source, said fuel pump, and terminating at said fuel nozzle.

7. The engine of claim 1, wherein said means for providing a fuel-air spray to said combustion chamber comprises:
   (a) a fuel-air injector disposed within said combustion chamber so that the fuel-air spray is in close proximity to said igniting means;
   (b) a fuel-air mix manifold, said manifold comprising a tee having a fuel inlet having a nozzle, a compressed air inlet, and a mixed fuel-air outlet so that a metered amount of fuel is mixed with a controlled amount of air;
   (c) means for providing fuel to the fuel inlet of said manifold;
   (d) means for providing compressed air to the compressed air inlet of said manifold; and
   (e) a conduit connecting the fuel-air outlet of said manifold to said injector.

8. The engine of claim 7, wherein said igniting means comprises a spark ignitor.

9. The engine of claim 8, wherein said fuel-air injector is located so that the fuel-air spray comes within about 1/32 of an inch to said spark ignitor.

10. The engine of claim 7, wherein said fuel providing means comprises:
    (a) a source of fuel;
    (b) a fuel pump;
    (c) a conduit interconnecting said fuel source and said fuel pump to said manifold; and
    (d) a solenoid valve in said conduit so that fuel flow to the manifold can be controlled.

11. The engine of claim 7, wherein said fuel-air injector comprises a high-strength heat-resistant metal alloy tubing.

12. The engine of claim 11, wherein said alloy tubing comprises Inconel tubing.

13. The engine of claim 7, wherein said conduit comprises a corrosion resistant metal tubing.

14. The engine of claim 13, wherein said conduit is stainless steel tubing.

15. The engine of claim 7, wherein said means for providing compressed air comprises:

(a) a source of compressed air; and (b) a conduit extending from said source of compressed air and terminating at said manifold compressed air inlet.

16. The engine of claim 15, wherein said conduit includes a restriction to reduce the pressure to about 12 psig for optimum combustion.

17. The engine of claim 1, wherein said preheating means comprises:

(a) a glow plug mounted on and extending into said combustion chamber; and (b) a band heater disposed around said combustion chamber.

18. The engine of claim 17, wherein said glow plug provides about 150 watts of heat and said band heater provides about 650 watts of heat.

19. The engine of claim 1, further including a cone assembly connected to the inlet of said engine head so that compressed air directed to the cone assembly is fed to the engine head inlet.

20. The engine of claim 1, further including means for injecting fog oil into the exhaust of said combustion chamber so that obscurant smoke is generated.

21. The engine of claim 20, wherein said fog oil injecting means comprises:

(a) a source of fog oil;

(b) a controllable fog oil pump;

(c) tubing from said combustion chamber exhaust;

(d) a nozzle mounted in said combustion chamber exhaust tubing; and (e) a conduit interconnecting said fog oil source, said fog oil pump, and said nozzle so that fog oil can be sprayed into the combustion chamber exhaust.

22. A method of burning different fuels in a combustion engine comprising the steps of:

(a) preheating a combustion chamber;

(b) providing a first fuel-air mix directly to the combustion chamber;

(c) igniting said first fuel-air mix within said combustion chamber;

(d) simultaneously providing a second fuel-air mix to an engine head connected to said combustion chamber so that the second fuel-air mix is exhausted into said combustion chamber from said engine head; and (e) after reaching operating temperature within said combustion chamber, stopping the direct flow of the first fuel-air mix to the combustion chamber and stopping the flow of compressed air to the engine head.

23. The method of claim 22, wherein said engine is a Lenoir cycle combustion engine.

24. A method of generating obscurant smoke from the method of claim 22, further comprising the step of injecting fog oil into the exhaust of said combustion chamber after said combustion chamber has reached operating temperature.

25. The method of claim 22, wherein said fuels are selected from the group consisting of gasoline, diesel and kerosene.

* * * * *

UNITED STATES PATENT AND TRADEMARK OFFICE
Certificate

Patent No. 5,665,272                    Patented: September 9, 1997

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: William A. Adams, Janice A. Fritz, Terry L. Thurman and Vincent D. Auber.

Signed and Sealed this Fifteenth Day of May, 2001.

ROBERT A. DAWSON
*Supervisory Patent Examiner*
Art Unit 1712